United States Patent

[11] 3,623,663

| [72] | Inventor | Walter J. Koinzan<br>Elgin, Nebr. 68638 |
|---|---|---|
| [21] | Appl. No. | 15,982 |
| [22] | Filed | Mar. 3, 1970 |
| [45] | Patented | Nov. 30, 1971 |

[54] IRRIGATION SYSTEM
23 Claims, 36 Drawing Figs.

[52] U.S. Cl. ............................................... 239/177,
137/344, 239/223
[51] Int. Cl. ................................................. B05b 3/04
[50] Field of Search ......................................... 239/177,
212, 222.17, 222.19, 222.21, 223, 224; 137/344

[56] References Cited
UNITED STATES PATENTS

| 2,941,727 | 6/1960 | Zybach | 239/177 |
| 2,893,643 | 7/1959 | Gordon | 239/177 X |
| 1,215,081 | 2/1917 | Todd et al. | 239/177 |
| 3,001,721 | 9/1961 | Zybach | 239/177 |
| 3,314,608 | 4/1967 | Curtis et al. | 239/177 |

Primary Examiner—M. Henson Wood, Jr
Assistant Examiner—Michael Y. Mar
Attorneys—Clarence A. O'Brien and Harvey B. Jacobson

ABSTRACT: A self-propelled irrigation system consisting of an elongated water-distributing pipe pivotally mounted at one end in engagement with a water supply and supported throughout the length thereof by a plurality of mobile support towers selectively propelled by water-powered motors. The outermost tower runs continuously at a predetermined speed and, through a cable system, provides for an intermittent movement of the towers inwardly thereof, the movement of each tower controlling the movement of the tower controlling the movement of the tower immediately inward thereof through a selective opening and closing of water valves. The apparatus can be reversed, and incorporates an automatic cutoff system should excessive misalignment occur.

Walter J. Koinzan
INVENTOR

Walter J. Koinzan
INVENTOR 3,623,663

IRRIGATION SYSTEM

The instant invention relates to new and useful improvements in area watering systems wherein a tower supported water pipe travels in a circular path about a central supply point.

It is a primary object of the instant invention to provide a self-propelled mobile irrigating system wherein a plurality of support towers are utilized as a means for both supporting the water distributing pipe and moving the pipe over a predetermined area. It is contemplated that the water motors associated with the towers be selectively activated so as to effect a movement of each tower in response to a predetermined movement of the tower immediately outward thereof so as to maintain a specific alignment therebetween and a corresponding linear orientation of the pipe throughout its travel.

Other significant objects of the instant invention reside in the provision of means for automatically terminating both the supplying of water to the water-distributing pipe and the advancement of the apparatus across a field upon the occurrence of excessive misalignment. Likewise, it is considered significant that the construction of the unit be such so as to lend itself to ready installation on a given size land area for operation thereover in an economical and trouble-free manner, requiring only a single engine or power unit for the operation of the pumping apparatus which maintains the flow of water through the water-distributing pipe, this flow of water in turn being selectively utilized to activate the water-powered motors on the individual towers.

In achieving the objects of the instant invention, each of the pipe supporting and moving towers includes, in addition to a support for the water-distributing pipe itself, an auxiliary line which, through a cable-controlled valve, selectively diverts a portion of the water to a nozzle unit for discharge into operative engagement with a water wheel or turbine which in turn effects the driving of the support wheels of the tower itself. The activation of the water valve associated with each tower is effected in response to a predetermined movement of the tower immediately outward thereof. Further, a second nozzle unit is so orientated as to effect a reverse driving of the tower should it become desirable to operate the apparatus in a reverse direction. Each tower is additionally provided with guide means which accommodate a grounding wire in a manner whereby an automatic cutoff system is provided for the pump energizing motor should excessive misalignment occur. The water-distributing pipe itself is provided with flexing joints so as to accommodate itself to the movement of the towers as well as surface conditions of the ground over which the towers travel.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
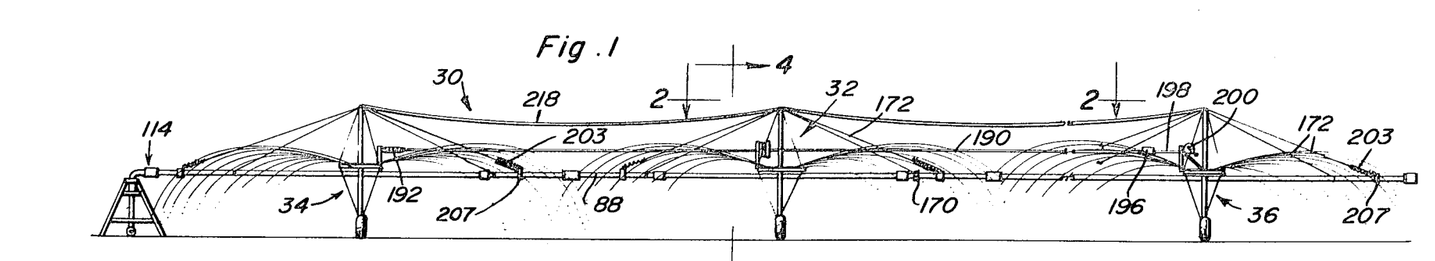
FIG. 1 is an elevational view of a portion of a system constructed in accordance with the instant invention.

Referring now more specifically to the drawings, reference numeral 30 is used to generally designate the apparatus utilized in the system of the instant invention. FIG. 1 illustrates the basic arrangement of the system and, while this FIG. illustrates only a single intermediate tower or tower structure 32, between the innermost tower 34 and the outermost tower 36, it should be appreciated that the instant invention actually contemplates a plurality of such intermediate towers, the particular number of which depending upon the area to be irrigated.

Figures 2, 3:
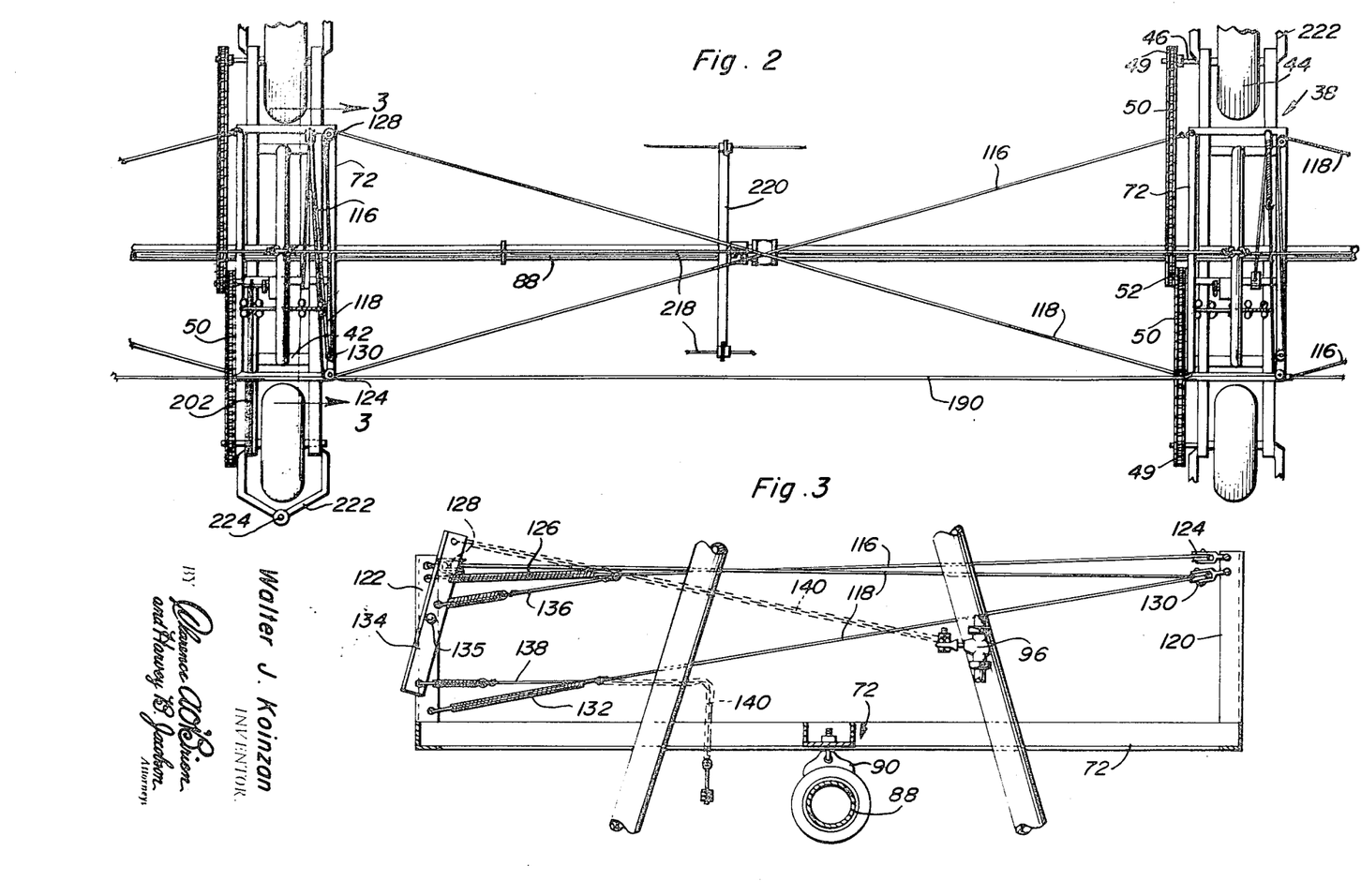
FIG. 2 is an enlarged partial plan view taken substantially on a line passing along line 2—2 in FIG. 1.
FIG. 3 is an enlarged cross-sectional view taken substantially on a plane passing along line 3—3 in FIG. 2.
Figures 4, 6:
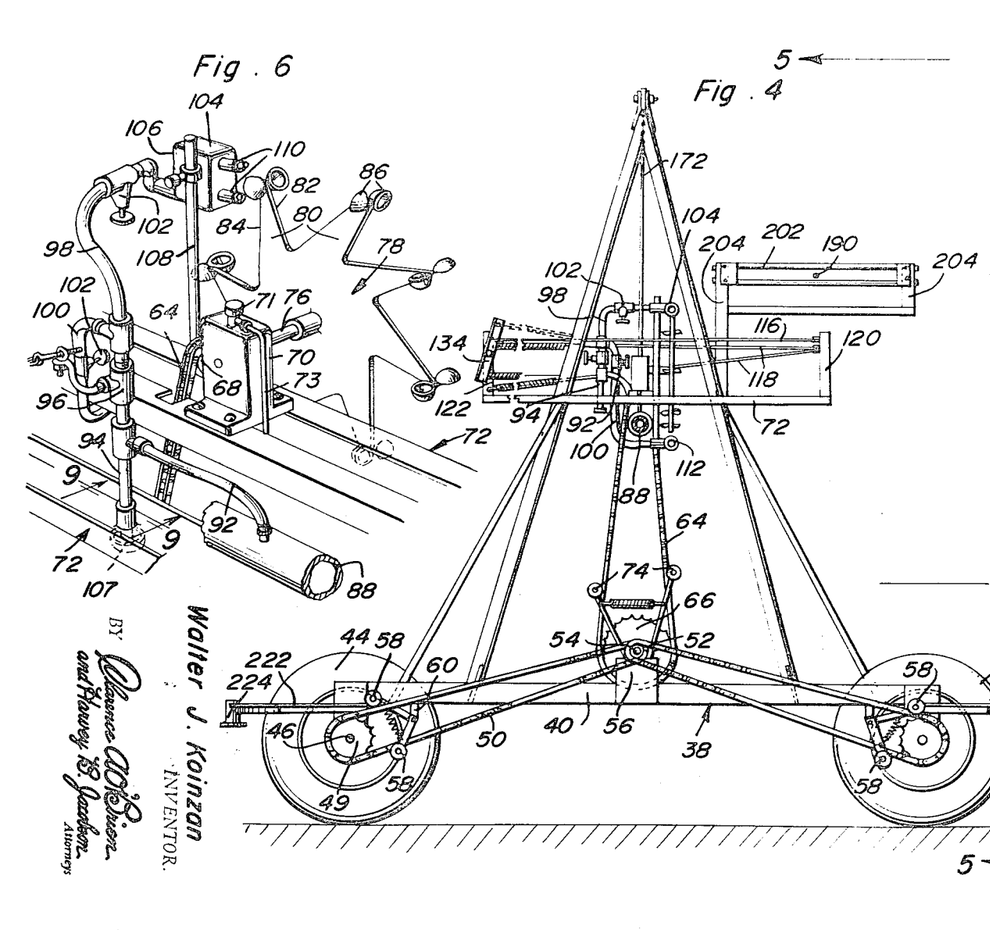
FIG. 4 is an enlarged cross-sectional view taken substantially on a plane passing along line 4—4 in FIG. 1.
FIG. 6 is a perspective detail of a typical water wheel and the associated apparatus.
Figure 5:
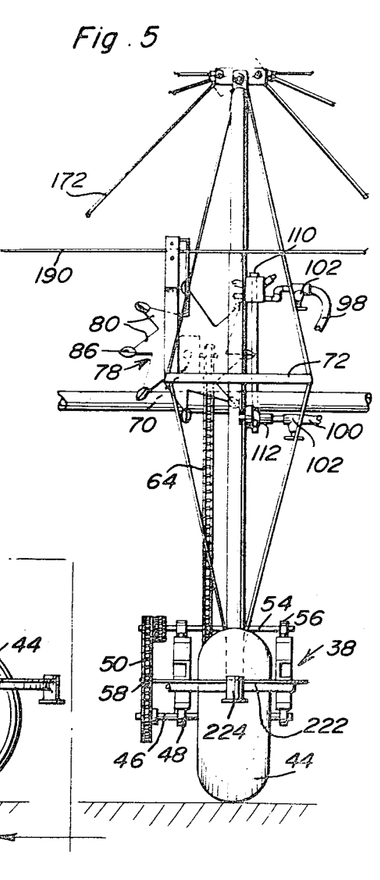
FIG. 5 is a view taken substantially on a plane passing along line 5—5 in FIG. 4.
Figure 7:
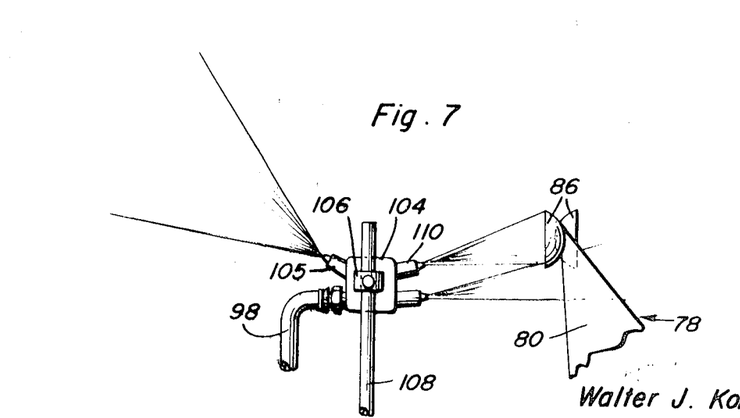
FIG. 7 is an enlarged detail view of the upper nozzle unit and the operation thereof.

The basic structure of all of the towers is similar, with the details of a particular tower being best appreciated from a viewing of FIGS. 2, 4 and 5. Each tower includes a lower carriage portion 38 consisting of a pair of elongated laterally spaced beams 40 interconnected by a plurality of crossbeams 42. An enlarged traveling wheel 44 is positioned between the carriage beams 40 at each end thereof, each wheel 44 being fixed to an appropriate shaft 46 which is in turn rotatably mounted within appropriate journal units 48 affixed to and depending from the corresponding ends of the beams 40.

Each of the wheel shafts 46 projects laterally beyond one of the carriage side beams 40 and has a sprocket 49 fixed thereto. A separate drive chain 50 engages about each of the sprockets 49 and extends therefrom to and about a sprocket 52 mounted on a centrally located drive shaft 54, the shaft 54 being positioned transversely across the tower carriage centrally thereof and supported within appropriate journals or bearing blocks 56. Tension is maintained in each of the chains 50 by means of a pair of pivotally mounted idler wheels 58 pinned to a depending ear 60 on the adjacent beam 40 and spring-biased toward each other and into engagement with the upper and lower runs of the corresponding chain 50.

The centrally located shaft 54 is power driven by means of a vertically extending endless chain 64 engaged about an enlarged sprocket 66 fixed to the shaft 54 and projecting vertically therefrom into meshing engagement about a drive gear or sprocket 68 projecting from an appropriate gear box 70 mounted on a support frame or platform 72 positioned approximately at midheight on the corresponding tower. A capped filler pipe 71 and vent tube 73 are installed on top of the gear box with the tube 73 extended below the gear box base. The gear box 70 can then be filled to the top with oil. The long vent tube 73 will prevent moisture from being drawn into the gear box 70 and the shaft seals will not dry out when the oil level is above them. A pair of spring-loaded idler wheels 74 are pivotally mounted and spring-biased toward each other for engagement with the opposed runs of the vertical chain 64 so as to maintain the proper tension thereon.

The power input shaft 76, associated with the gear box 70, mounts an enlarged vertically orientated water wheel 78 on the outer end thereof. This wheel 78, in a vertical plane paralleling the length of the system includes a series of peripherally spaced outwardly projecting arms 80, each including a generally radially extending edge 82 and a generally tangential edge 84. Each arm 80 in turn mounts a pair of concave cups 86 on the outer end thereof, the cups 86 of each pair of cups being laterally aligned and opening in diametrically opposed directions. The cups 86 are so orientated on and through the configuration of the arms 80 as to selectively receive a stream of pressurized water thereagainst and effect a driving of the tower through the sprocket and chain arrangement just described. The oppositely directed cups 86 on each arm 80 are deemed particularly significant in that such enable a selective driving of the tower in either of two directions.

The water for activating the water-powered motor of each tower is received directly from the elongated water-distributing pipe 88 which extends transversely across each of the support towers and is appropriately mounted thereon by a swivel-type bracket 90, note FIG. 3, engaged with and depending centrally from the elevated support platform 72. This swivel bracket 90, including a collar which circles the pipe 88, is such so as to allow for some movement of the pipe relative to the tower so as to eliminate undue stress in the pipe itself. A reduced diameter water line 92 extends, at each of the towers, from the water-distributing pipe 88 to a vertical water-carrying pipe 94, the lower end of which is fixed to the support frame 72. The pipe 94 includes a water flow control valve 96 positioned between the feed line 92 and a pair of lines 98 and 100, each of which includes a manual shutoff valve 102. The line 98 extends to a nozzle unit 104 adjustably mounted, through a collar and setscrew combination 106, on the upper end of a rigid rod 108 extending upwardly from the frame platform 72. This nozzle unit includes a pair of nozzles 110 alignable with one set of cups 86, that is those cups facing in a first direction, as the irrigating bearing arms approach an upwardly extending position. Two nozzles 110 are utilized so as to, through the positioning of the nozzles at slightly different angles from each other, avoiding any tendency for the wheel 78 assuming a dead position and failing to start upon the discharge of a stream of pressurized water from the nozzle unit 104. The water discharging from the nozzles 110, in addition to driving the wheel 78, also provides an auxiliary means for watering of irriagating the area laterally of the corresponding tower along the pipe 88. Further, in order to provide a balanced watering to both sides of each tower, a third nozzle 105 is provided on the opposite side of the unit 104, thus forming a watering pattern as suggested in FIG. 1.

Figure 9:
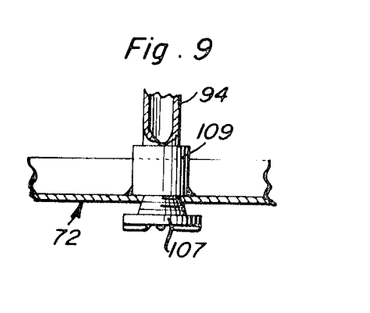
FIG. 9 is an enlarged sectional detail taken substantially on a plane passing along line 9—9 in FIG. 6.

The line 100 extends to a nozzle unit 112 which is a duplicate of the nozzle unit 104 and similarly includes a pair of wheel driving nozzles orientated at slightly different angles and a third oppositely directed nozzle. The nozzle unit 112, however, is mounted on a depending extension of the rod 108 below the support platform 72, and hence below the center of rotation of the wheel 78. Thus, as a stream of pressurized water is discharged from the lower nozzle unit 112, impinging against the second set of cups 86 as the arms assume a substantially vertical depending orientation, the wheel 78 will be driven in a reverse direction. As will be appreciated, the hand valves 102 will be used so as to control which nozzle unit, 104 or 112 is to be utilized, and hence which direction the tower is to move. It is contemplated that the lower nozzle unit 112 also be vertically adjustable on the rod 108. It will also be noted that the activation of the water-powered drive assembly on each tower is controlled by an opening and closing of the water flow control valve 96. With reference to FIG. 9, an automatic drain valve 107 is provided in communication with the lower end of the pipe 94 through an aperture in the frame 72 and a pipe mounting coupling 109 for a selective draining of the pipe, hoses and valves.

Figure 12:
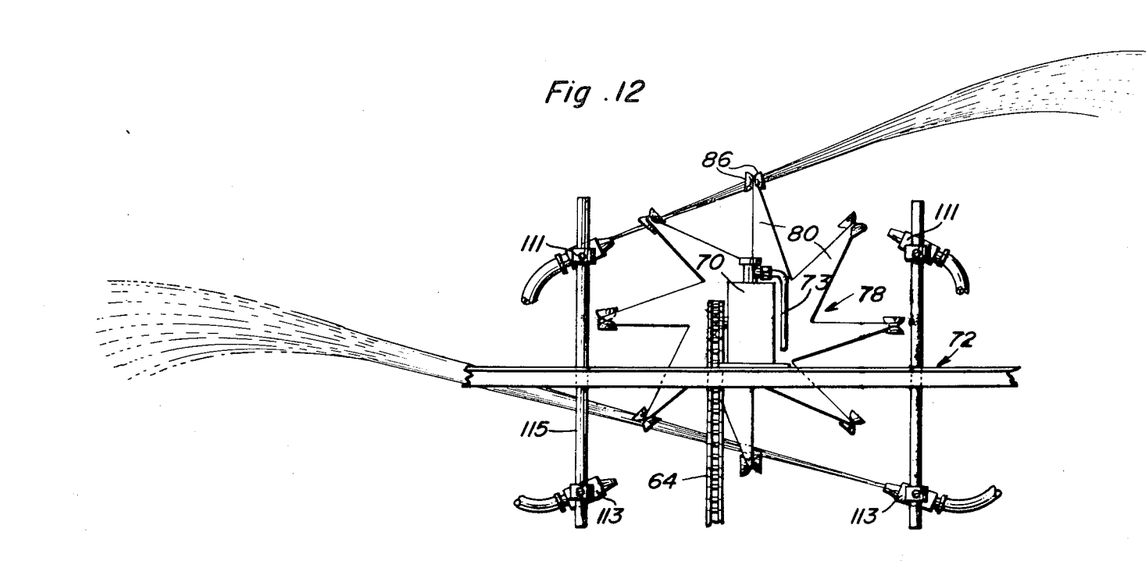
FIG. 12 illustrates a modified form of nozzle arrangement.

Reference is now made to FIG. 12 wherein a variation in the arrangement of the wheel driving nozzles has been illustrated. In this arrangement, two pairs of upper and lower nozzle units 111 and 113 are provided to the opposed sides of the wheel 78 in the vertical plane thereof. Each pair of nozzle units 111 and 113 are mounted on a common vertical rod 115 fixed to and projecting both above and below the support frame 72. The nozzle units 111 and 113 are adjustable in the manner of the originally described nozzle units 104 and 112. The actual utilization of the nozzles 111 and 113 involves a simultaneous discharge of wheel moving water through the upper nozzle unit 111 of one pair of such units and the lower nozzle unit 113 of the other pair of such units as clearly illustrated in FIG. 12. When the irrigating system is to move in an opposite direction, the other two nozzle units will be utilized. By the utilization of two separate nozzle units, it will be appreciated that a positive driving of the wheel 78 will be effected at generally diametrically opposed points. Further, by directing the water which drives the wheel 78 in opposite directions, there will be an even spread of the water between the towers so as to enhance the irrigating potential thereof without necessitating the use of an auxiliary nozzle, such as nozzle 105 associated with the nozzle unit 104. It will of course be appreciated that the water supplying valve controlled pipes and hose sections are to be properly arranged so as to selectively supply one or the other of the cooperating sets of nozzle units generally in the same manner as set forth with regard to the initially described nozzle unit arrangement. For example, dual hoses can be provided in place of each of the originally described hoses 98 and 100.

The selective opening and closing of the water flow control valve 96 associated with each tower is to be effected directly in response to movement of the next outer tower with the outermost tower 36, that is the tower supporting the remote end of the water-distributing pipe 88 relative to the source connected end 114, being constantly driven at a substantially predetermined speed upon the presence of pressurized water within the main water-distributing pipe 88. This can be effected by eliminating a control valve 96 on this outermost tower 36 with the flow from the associated tap line 92 passing freely into the associated line 98 or line 100 depending on the desired direction of movement. The control of each of the remaining towers is effected, as previously indicated, directly from the tower immediately outward thereof. This is done by means of a cable arrangement which will be best understood from a viewing of FIGS. 2 and 3. For purposes of illustration, the right-hand tower in FIG. 2 will be hereinafter referred to as the outer tower, while the left-hand tower will be referred to as the inner tower. The cable arrangement includes a pair of cables 116 and 118 fixed to the opposite end portions of the platform 72 of the outer tower and extending therefrom, crossing each other, to the opposite ends of the support platform 72 of the inner tower. The support platform 72 of the inner tower includes, at the opposite ends thereof, a pair of uprights 120 and 122 with which the control cables 116 and 118 engage. The control cable 116 extends from the support platform 72 of the outer tower to and about a pulley 124 mounted on the upright 120 on the support platform 72 of the inner tower. After the cable 116 extends about the pulley 124, it continues parallel to the supporting frame 72 to the upright 122 to which it is fastened through an elongated oiled tension spring 126. The control cable 118 in turn extends to and about a pulley 128 mounted on the upright 122 with the cable 118 subsequently extending about a second pulley 130 mounted on the upright 120 and then back to the upright 122 adjacent the lower end thereof where it is fixed through an interposed elongated coiled tension spring 132. Thus, it will be appreciated that the spring-loaded ends of both cables 116 and 118 are affixed to the upright 122, the cable 116 adjacent the upper end thereof and the cable 118 adjacent the lower end thereof.

An elongated control arm or bar 134 generally parallels the upright 122 and is pivotally secured thereto between the spring-loaded ends of the cables 116 and 118 at a point designated by reference numeral 135. The control bar 134 both above and below pivot point 135 is respectively secured, by spring-loaded cables 136 and 138, to the adjacent ends of the cables 116 and 118 immediately forward of the associated springs 126 and 132. In this manner, a pull on either of the cables 116 or 118, resulting from a traveling of the outer tower, will effect an inward pivoting of the corresponding upper or lower end of the control bar 134 and a resultant outward swinging of the opposite end of the bar. This outward swinging of the opposite end of the control bar 134 is utilized so as to activate the water flow control valve 96 of the inner tower in that an elongated flexible chain 140 extends from each end of the control bar 134 for selective engagement with the control valve 96 in a manner whereby a tensioning of the chain 140 will effect an opening of the valve 96. Only one of the chains 140 is to be engaged with the control valve 96 at any time. The particular chain to be engaged depends upon the direction of movement of the apparatus as shall be explained presently.

In operation, assuming the apparatus pictured in FIG. 2 is to move downwardly or counterclockwise, the upper chain 140 will be connected to the control valve 96 and the lower chain 140 disconnected. As the outer tower moves, the control cable 118 is tensioned. This in turn, through a stretching of the spring 132, effects a pull, by means of the connecting cable 138, on the lower end of the control bar 134, resulting in an outward movement of the chain connected upper end of the pivotally mounted bar 134 and an opening of the control valve 96. Upon a opening of the control valve 96, water flows to and out of the selected nozzle unit and effects activation of the water motor of the inner tower. The inner tower will continue traveling until the tension is relived in the cable 118 sufficiently so as to allow for a retraction of the spring 132 and a slight tensioning of the cable 116 so as to pivot the control bar 134 and close the valve 96. By the same token, it will be appreciated that the traveling of the tower designated as the inner tower in FIG. 2 will, through the system described supra, effect a sequential traveling of the tower immediately inward thereof. In this manner, with the outermost tower 36 traveling continuously, a sequential movement of the remainder of the towers about the pivotally connected source end of the water-distributing pipe, with the towers remaining in substantial alignment, will be effected.

Figures 10, 11, 16, 17:
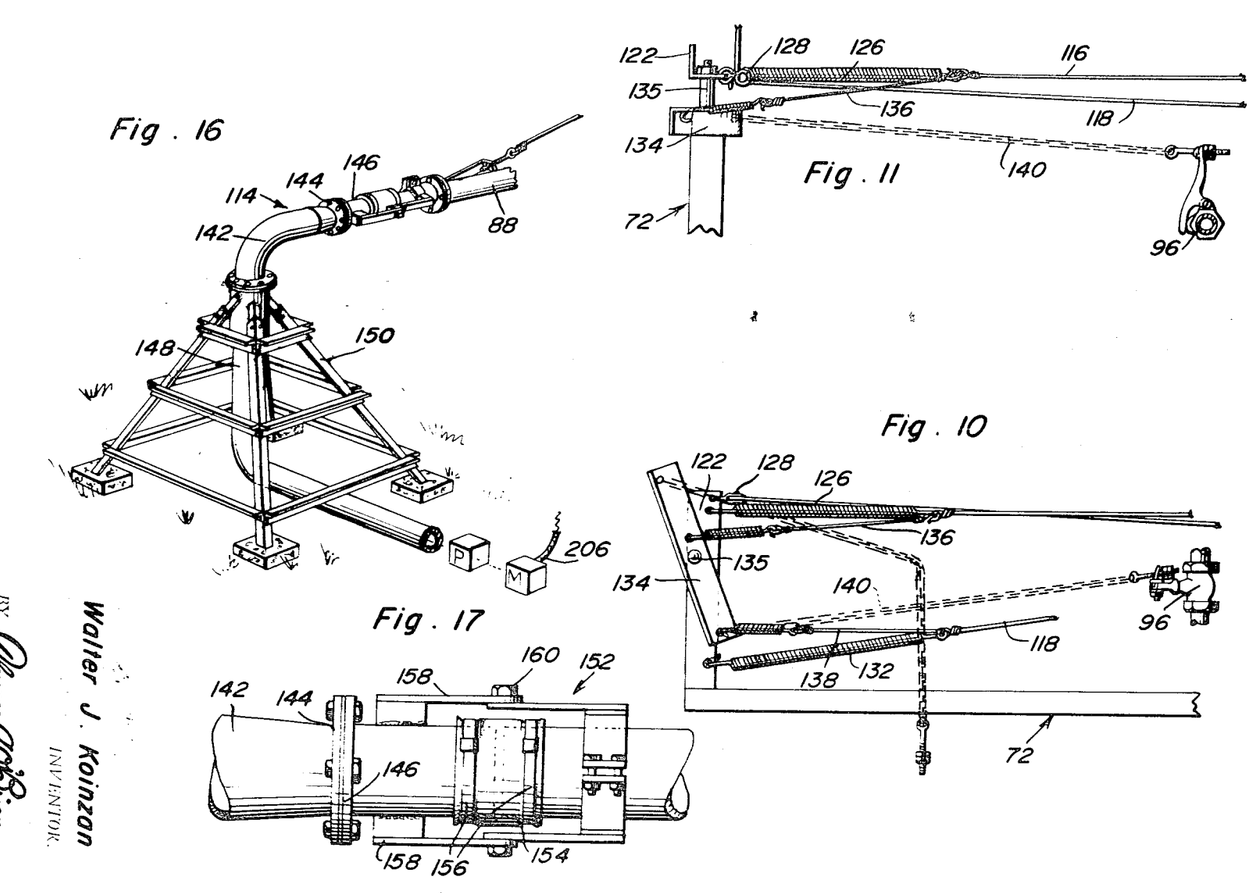
FIG. 10 is a view similar to FIG. 3 illustrating a setup for effecting a reverse travelling of the system.
FIG. 11 is a top plan view of the FIG. 10 arrangement.
FIG. 16 is a perspective view of the pivotally mounted end of the water-distributing pipe.
FIG. 17 is an enlarged top plan view of the pipe joint provided at the pivotally mounted end of the water-distributing pipe.

Should it be desirable for the towers to travel in the opposite direction, that is upwardly or counterclockwise as illustrated in FIG. 2, the upper chain 140 will be disconnected and the lower chain 140 connected to the control valve 96, such an arrangement being illustrated in FIG. 10. Thus, as the outer tower travels, a tensioning of the cable 116 is effected, this in turn resulting in an outward swinging of the chain connected lower end of the control bar 134 and an opening of the valve 96, resulting in a sequence as described supra. In each instance, it will of course be appreciated that the water flow at each tower controlled by the associated control valve 96 will have to be directed through the appropriate upper or lower nozzle unit 104 or 112, depending upon the direction of movement of the tower. Thus, a reversing of the direction of movement of the apparatus will require both a switching of the chains 140 and a diverting of the valve controlled water flow through the opposite nozzle unit. Both manipulations, however, can be easily and rapidly effected.

Figure 13:
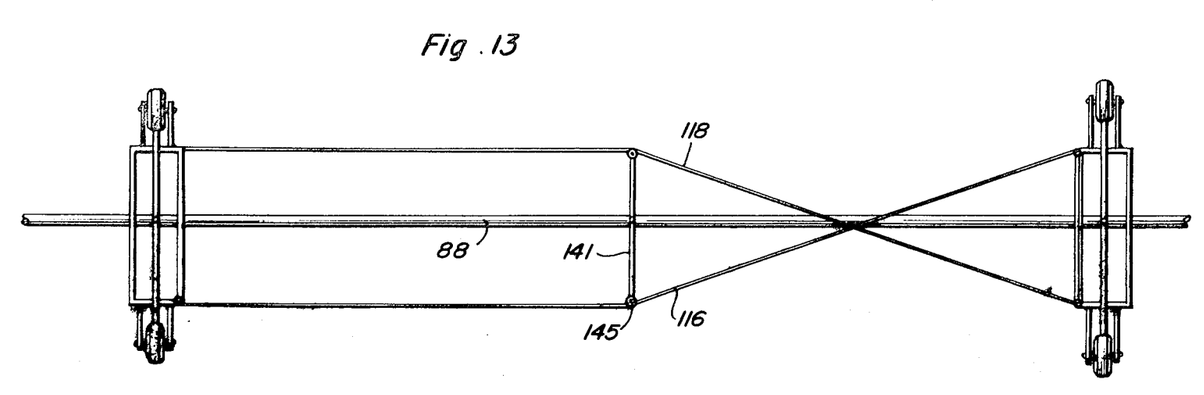
FIG. 13 illustrates a variation in the tower movement controlling cable.
Figure 14:
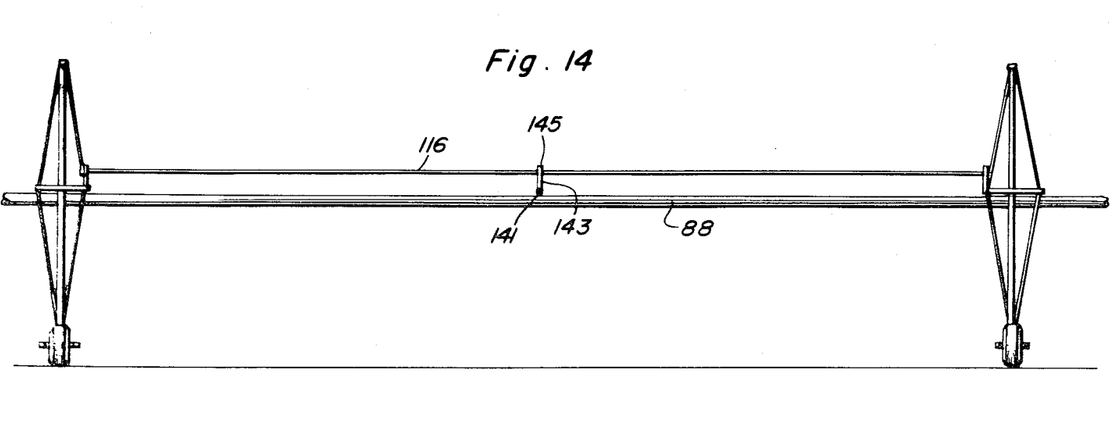
FIG. 14 is an elevational view of the structure of FIG. 13.

FIGS. 13 and 14 schematically illustrate a variation or a relocation of the valve opening cables 116 and 118 between adjacent towers. Instead of extending or running diagonally between the towers, crossing at the center point therebetween, each of the cables 116 and 118 extends, from the outer of the pair of towers, to the opposite end of a cross bar 141 affixed transversely across the section of the water pipe 88 extending between the involved pair of towers. The opposed ends of the cross bar 141 are provided with vertical risers 143, each of which mounts a cable retaining pulley 145 on the upper end thereof. These pulleys retain and guide the corresponding cables thereover with each of the cables 116 and 118 extending in a straight line to the corresponding end of the inner of the two towers. Such an arrangement tends to provide a more exact control, that is tends to open and close the valve 96 operated thereby with less tower movement. Incidently, if the system is to only operate in a single direction, it will of course be appreciated that only one control cable will be required.

Figures 15, 20, 29:
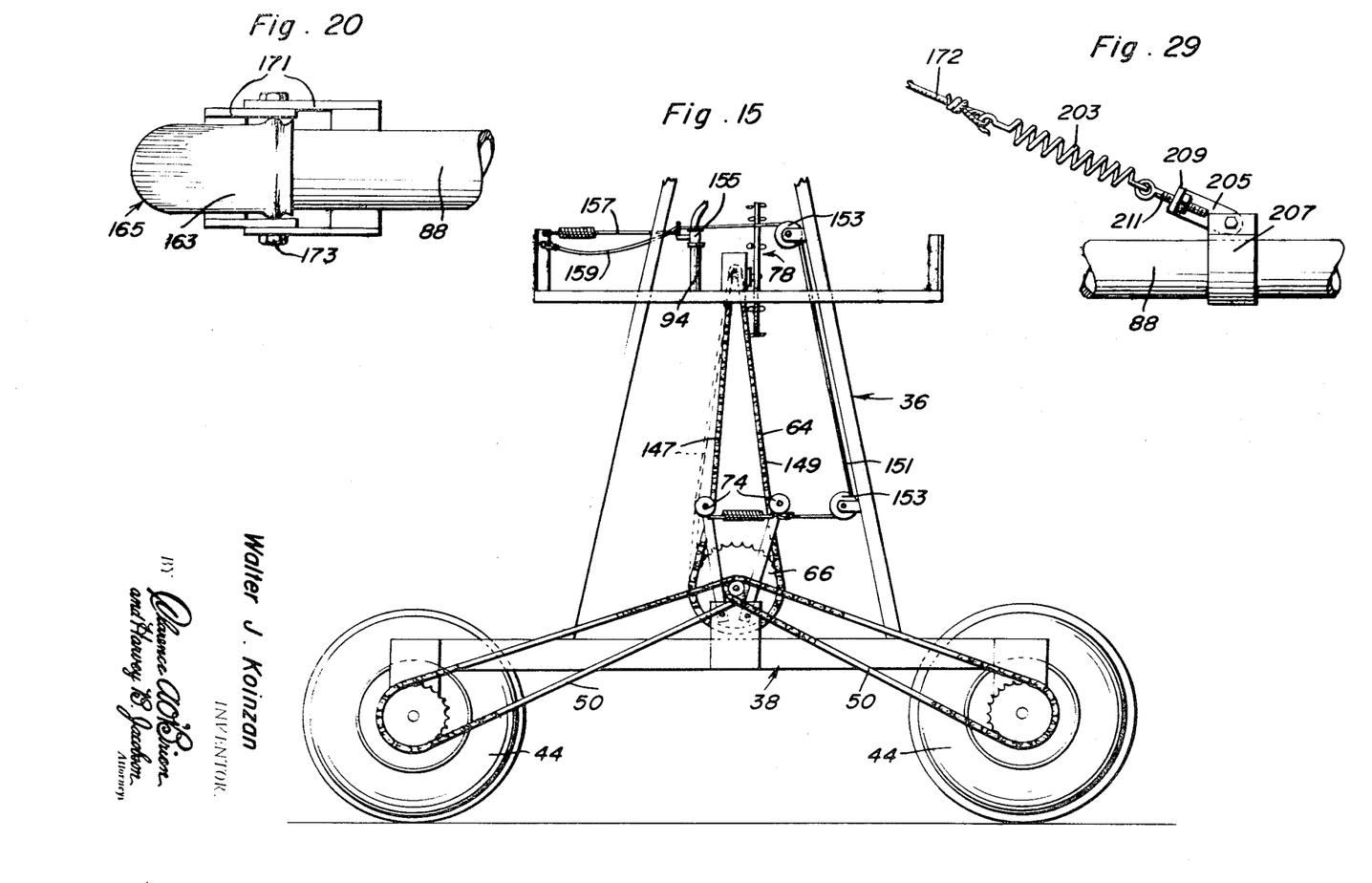
FIG. 15 illustrates a speed control system for the endmost tower.
FIG. 20 is a top plan view of the joint of FIG. 18.
FIG. 29 illustrates a modified form of suspension cable anchor means.

Attention is now directed to FIG. 15 wherein a speed control system for the irrigation apparatus has been illustrated. This speed control system will be incorporated in the end or outermost tower 36 should its use be considered necessary or desirable. The express purpose of the speed control system is to slow down the speed of the end tower when travelling downhill or in fact at any time when the end tower has a tendency to coast freely. Assuming the end tower 36 is moving to the left in FIG. 15, driven through the water-powered rotation of the wheel 78, the forward vertical drive chain run 147 will be slack while the rear vertical drive chain run 149 will be tensioned with the chain tightener retaining the runs 147 and 149 as illustrated in full lines. When the tower 136 picks up speed beyond that effected by the water driven wheel 78, the slack chain run 147 will tighten up and move to the phantom line position. This in turn will shift the chain tightener to the left which will tension the elongated pulley guided governor cable 151. The governor cable 151 extends over a series of pulleys 153 and has the remote end thereof affixed to a valve 155 provided in the water supplying pipe 94 in a manner whereby upon a tensioning of the cable 151, the valve 155 will move toward a closed position against the biasing force of a spring loaded cable 157 which normally retains the valve 155 open. The amount that the governor cable 151 closes the valve 155 is set by an adjustable check cable 59. Once the end tower 36 slows down, and the drive chain starts pulling, the chain tightener will again move to the full line position of FIG. 15, releasing the tension on the governor cable 151 and allowing the valve 155 to fully open under the influence of the spring loaded cable 157.

Referring now specifically to FIG. 16, it will be noted that the source connected end 114 of the water-distributing pipe 88 includes a right-angular elbow 142 having a first flanged end 144 thereof bolted to the flanged end 146 of the main length of the pipe 88. The vertically directed let of the elbow 142 is in turn rotatably received within the upper end of an upturned end portion of a supply pipe 148 whereby a rotational or pivotal movement of the water-distributing pipe 88 about the vertical end portion of the supply pipe 148 is possible, the apparatus traveling in a circular path thereabout. A suitable structural framework 150, ground anchored in an appropriate manner, will be utilized so as to rigidly support the vertical portion of the supply pipe and provide a solid pivot point for the traveling apparatus. The supply pipe itself will extend to an appropriate water supply from which water is drawn and pumped through the supply pipe to the water-distributing pipe by motor-driven pump means (schematically illustrated).

Various types of flexible couplings are provided in the water-distributing pipe 88 at points along the length thereof, particularly between the individual towers as well as between the innermost tower and the source connected end 114. These flexible couplings are specifically provided so as to accommodate the bending and stresses introduced into the pipe as the towers travel over uneven ground.

Referring to FIGS. 16 and 17, a flexible coupling or joint construction 152 which is deemed particularly desirable at the source connected end of the pipe 88 has been illustrated. This coupling 152 includes a flexible hose sleeve 154 clamped to and about the slightly spaced ends of a pair of adjacent pipe sections by appropriate band clamps 156 in a manner so as to span the joint. Additionally, and so as to enable only a vertical flexing of the pipe sections relative to each other, two pairs of rigid side straps or bars 158 are provided. These straps 158 consist of two straps rigidly fixed to each pipe section in outwardly spaced relation thereto at diametrically opposed points, the straps extending forwardly into overlapping engagement with the straps affixed to the second pipe section with appropriate pivot pin means 160 engaging the overlapping ends of the straps to the opposite sides of he sleeve enclosed joint. The actual mounting of the straps or bars 158 to the pipe sections can be effected by either split clamp means or by welding. With these straps 158 thus orientated to the opposite sides of the joined pipe sections, it will be appreciated that while a limited degree of vertical movement of the pipe sections relative to each other is possible, lateral movement therebetween is substantially precluded. While this type of joint construction 152 is particularly adapted for use adjacent the source connected end of the pipe 88, similar joints can be provided between the towers if deemed desirable.

Figure 18:
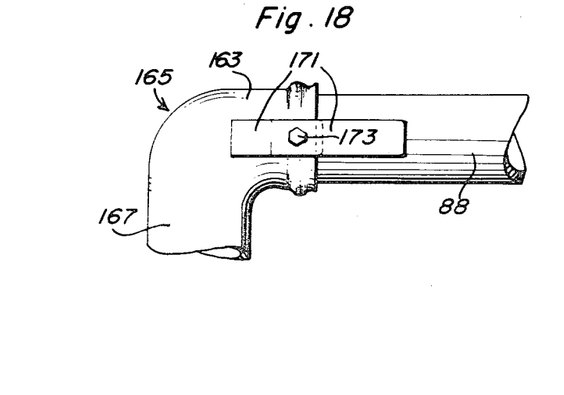
FIG. 18 is an elevational view of a modification of the pipe joint of FIGS. 16 and 17.
Figure 19:
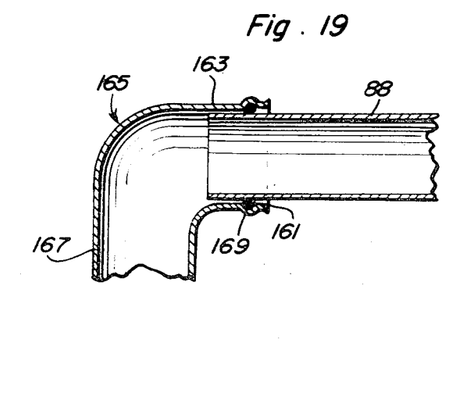
FIG. 19 is a longitudinal cross-sectional view through the pipe joint of FIG. 18.

FIGS. 18, 19 and 20 illustrate another form of joint particularly adaptable for use at the source connected end of the pipe 88. In this form, the end of the water pipe 88 is telescopically received within the slightly flared mouth 161 of the horizontal leg 163 of an elbow 165, the vertical leg 167 of which is engaged with an upturned end portion of a supply pipe as in FIG. 16. The end of the water pipe 88 is sealed within the elbow and leg 163 by means of an annular rubber gasket 169 provided within an internal annular groove within the leg 163 in surrounding relation to the telescopically inserted end of the pipe 88. The pipe 88 is retained within the coupling by means of two pairs of rigid side straps or bars 171. The straps 171 consist of two straps rigidly fixed to the water pipe 88 in outwardly spaced relation thereto at diametrically opposed points, and two straps similarly affixed to the horizontal leg 163 of the coupling elbow 165. The straps overlap and are interlocked by appropriate pivot pin means 173 which enable a limited degree of vertical flexing at the joint so as to avoid undue stress while retaining a positive sealed engagement therebetween.

Figure 21:
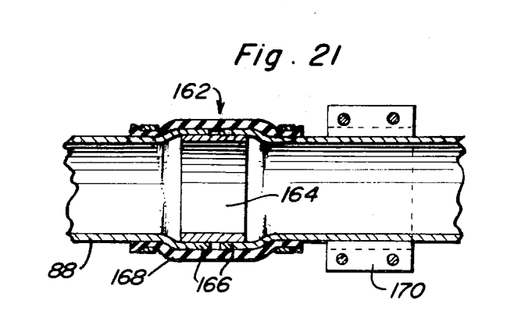
FIG. 21 is a cross-sectional detail of a flexible pipe joint.

FIG. 21 illustrates a further form of flexible joint 162, this joint normally being utilized between the mobile towers so as to accommodate a slight degree of flexing between sections of the pipe 88. As will be appreciated from FIG. 21, this joint includes a rigid annular pipe insert 164 received within the adjoining slightly belled ends 166 of the two pipe sections, and an enclosing rubber or elastomeric sleeve 168 strap clamped to the opposed sections. Incidently, with continued reference to FIG. 21, the split or two-piece clamp 170 noted to the right of the joint 162 is sued as an anchor means for one of the plurality of suspension cables 172 utilized to assist in supporting the water-distributing pipe 88 between the towers, such suspension cables 172 extending from the upper extremes of the towers.

Figure 22:
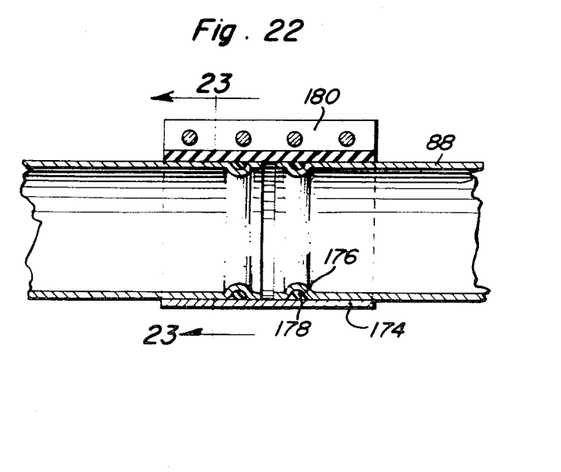
FIG. 22 is another form of pipe joint.
Figure 23:
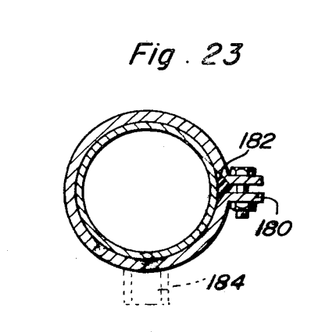
FIG. 23 is a cross-sectional view taken substantially on a plane passing along line 23—23 in FIG. 22.

FIGS. 22 and 23 illustrate a split coupling clamp 174 utilized to couple the adjacent ends of a pair of pipe sections, each pipe section end having an annular concave recess 176 thereabout which in turn receives a sealing O-ring 178 so as to effect a positive watertight seal with the surrounding bolt tightened clamp 174. The two edges of the clamp 174, adjacent the outwardly directed bolt mounting flanges 180, are slightly undercut so as to receive a triangular compressible gasket 182 which in turn provides upon a tightening of the clamp bolts, a positive watertight seal. The coupling clamp of FIGS. 22 and 23 is particularly useful as a means for mounting a pipe coupling 184 for the attachment of an appropriate discharge pipe or nozzle, the clamp 174 of course being drilled so as to enable the passage of water through the coupling 184. By the same token, it will be appreciated that the coupling clamp 174 could in fact be utilized to provide an outlet anywhere desired along the length of the water-distributing pipe 88, requiring only the tapping of a hole for alignment with the pipe coupling 184.

Figure 24:
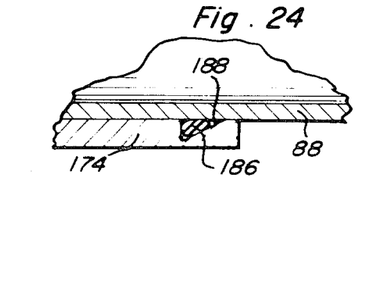
FIG. 24 is a cross-sectional detail illustrating a coupling clamp similar to that in FIG. 22 with a modified type of seal.

FIG. 24 illustrates a modified means of sealing the pipe clamp 174 to the pipe 88, such consisting of the utilization of a compressible O-ring seal 186 received within an annular groove 188 cut within the inner surface of the clamp 174 adjacent the end thereof, a similar groove and O-ring being provided at both ends of the clamp 174. In this manner, the adjacent ends of the two sections of the pipe 88 need not themselves be modified for the accommodation of an O-ring as in FIG. 22.

FIGS. 25 through 28 illustrate a combination pipe coupling and cable anchor. This construction includes a split coupling clamp 175 engaged about the adjacent ends of a pair of pipe sections of the water pipe 88. Each pipe section has a plurality of annular concave recesses 177 thereabout which receive sealing O-rings 179 so as to effect a positive watertight seal with the surrounding bolt tightened clamp 175. The actual bolt mounting of the clamp 175 is effected by extending a series of bolts 181 through aligned apertures in a pair of clamp mounted flanges 183 and 185. Noting FIG. 28 in particular, it will be appreciated that the flange 183 is set parallel to and slightly inward of the extreme edge of the clamp 175, while the flange 185 is affixed to the opposite edge of the clamp 175 in a manner so as to project laterally outward thereof whereby an edge recess 185' of a size so as to receive the opposed projecting edge is defined. In this manner, as the flanges 183 and 185 are brought together upon a tightening of the bolts 181, the first extending edge of the clamp 175 overlaps the projecting flange 185 and effects a positive watertight sealed engagement with the pipe sections. If desired, rubber gasket material can be provided in the recess 185' to enhance the seal.

Figure 25:
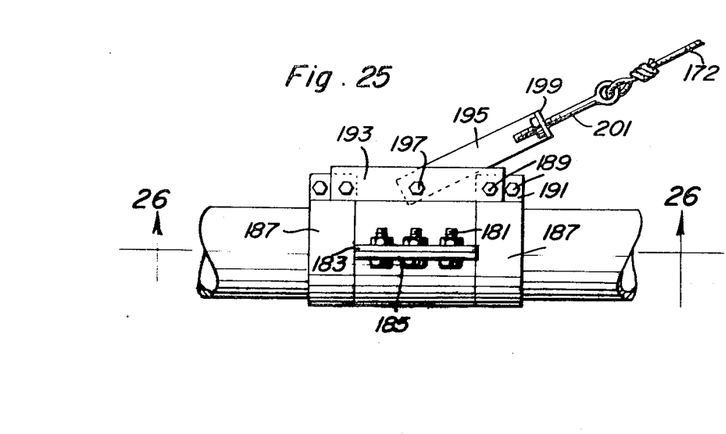
FIG. 25 illustrates a combination pipe clamp and support cable anchor.
Figure 26:
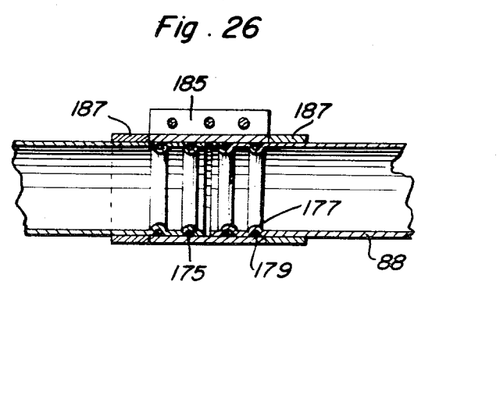
FIG. 26 is a cross-sectional detail taken substantially on a plane passing along line 26—26 of FIG. 25.
Figure 27:
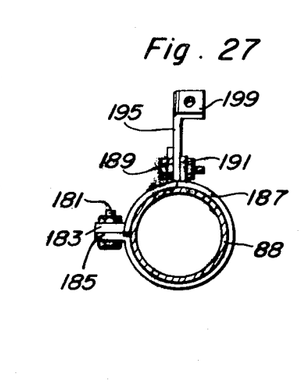
FIG. 27 is an end view of the clamp and anchor of FIG. 25.
Figure 28:
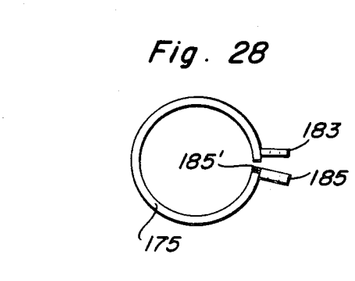
FIG. 28 is an end view of the unmounted clamp of FIG. 25.

Located immediately adjacent the opposite ends of the split coupling clamp 175 are a pair of split collars 187 which are rigidly clamped to the pipe sections by appropriate bolt means 189 extending through edge flanges 191 on the collars 187. It will be noted that two bolt units 189 are used in conjunction with each collar 187. Further, the collars 187 can incorporate the overlapped joint construction of the coupling clamp 175, as detailed in FIG. 28, if so desired. An elongated rigid tie bar 193 extends between the bolted collar flanges 191 and is affixed thereto by the inner bolt unit 189 on each collar 187 so as to retain the collars against any tendency to separate and also provide an anchor means for the end of one of the auxiliary support cables 172. The actual engagement of the cable 172 with the tie bar 193 is effected through a bar 195 having a first end pivotally secured to the tie bar 193 as indicated by reference numeral 197, and a second angularly bent end 199 which adjustably receives the threaded end of a cable locked eyebolt 201.

FIG. 29 illustrates an anchor for the support cable 172 wherein a coiled tension spring 203 is engaged between the end of the support cable 172 and a rigid straplike bracket 205 which is pivotally mounted to a simple pipe engaged split clamp 207. The spring 203 is itself adjustably engaged with the right angularly bent end 209 of the bracket 205 by means of a threaded eyebolt 211. The purpose of the spring at the outer end of the support cable is to relieve any undue stresses that might be introduced into the cable 172 due to a movement of the system over uneven ground. As will be appreciated, the particular pipe clamps and cable anchors utilized will depend primarily on the individual circumstances encountered in assembling the system for particular ground and field conditions. For example, FIG. 1 illustrates a system wherein the suspension cables are provided in pairs with the outermost cable 172 of each pair incorporating the tension spring arrangement of FIG. 29.

Figures 8, 30, 31, 32:
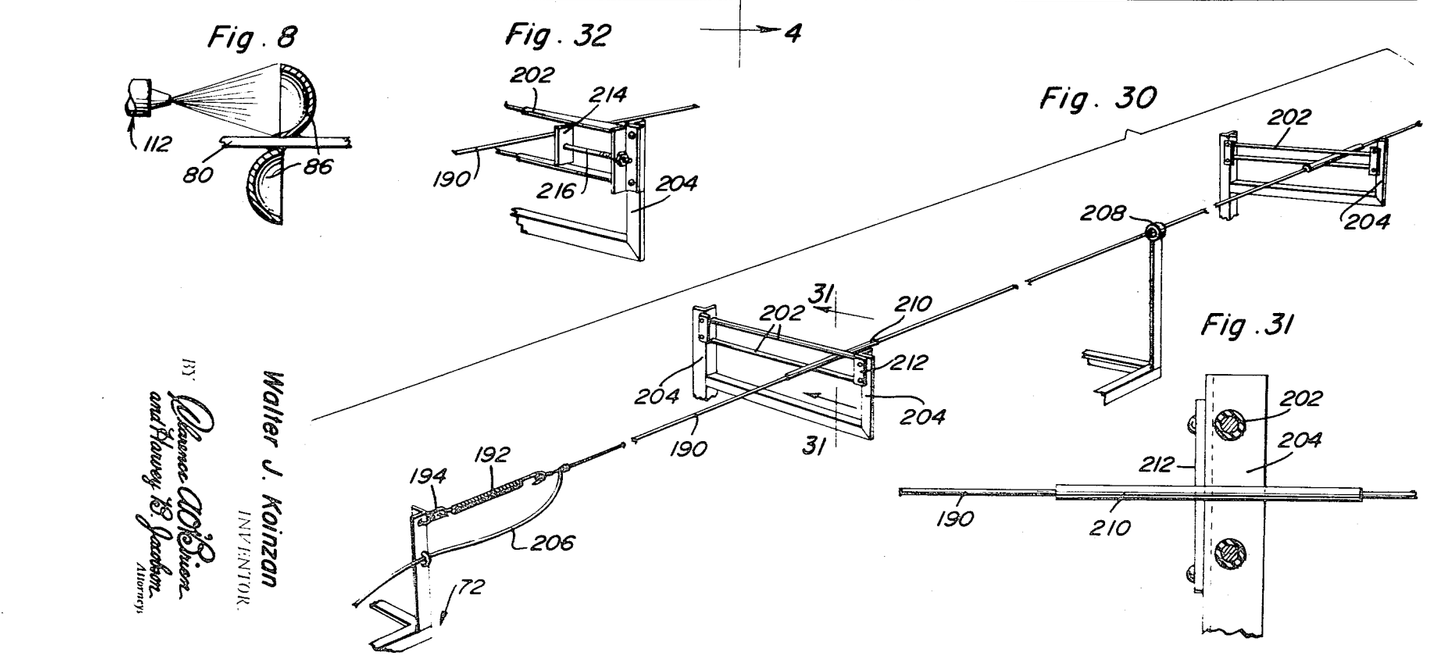
FIG. 8 is a sectional detail illustrating the relationship of the lower nozzle unit to the water wheel cups.
FIG. 30 is a schematic perspective view of the misalignment signalling system.
FIG. 31 is a cross-sectional detail taken substantially on a plane passing along line 31—31 in FIG. 30.
FIG. 32 is a perspective detail of an adjustable form of the grounding wire contact frame.

The system of the instant invention also contemplates the provision of means for automatically shutting off the pump energizing motor, and hence stopping the operation of the apparatus, should any excessive misalignment occur between the towers. In this regard, attention is particularly directed to FIGS. 1, 4 and 30–32. An elongated electrically conductive cable 190 extends along the length of the apparatus from the innermost tower 34 to the outermost tower 36. One end of the cable 190 is engaged, through a tensioning spring 192 and an insulator 194, with an upright on the supporting platform or frame 72 of the innermost tower 34, while the opposite end of the cable 190 is engaged, through a suitable insulator 196, with a winch wound length of cable 198 whereby a positive tension can be introduced into the cable 190, the winch being on the outermost tower and designated by reference numeral 200 in FIG. 1. Alternate ones of the intermediate towers 32, along the full length of the apparatus, are provided with parallel vertically spaced insulated bars 202 which receive the cable 190 therebetween, the bars 202 extending lengthwise along each tower, while the cable 190 passes substantially perpendicularly therethrough. The insulating bars 202 are supported, at the proper elevation so as to receive the cable 190 therethrough, but supporting members including a pair of upright grounding bars 204, one at each end of the insulated bars 202. Thus, upon one or more of the towers becoming so misaligned as to result in a movement of the cable 190 into engagement with one of the grounding bars 204, a safety switch, of any conventional type, on the pump energizing motor will be thrown, and the apparatus halted. The motor can be of any appropriate type, such as an electric motor or an internal combustion engine. Incidently, noting the left-hand end of FIG. 30, a grounding wire extension 206 will of course extend from the main wire or cable 190 to the motor switch. On those towers which alternate with the towers mounting the insulated bars 202, an appropriate insulated guide 208 will be provided so as to maintain the orientation and alignment of the cable or wire 190. For purposes of convenience, this insulating guide 208 can be mounted on an extension of the pulley mounting upright 120, the cable 190 generally aligning over the corresponding end of each of the support platforms 72. In order to provide for a more positive contact between the grounding cable 190 and the grounding bars 204, a copper sleeve 210 can be provided about the portion of the cable 190 which passes through each pair of insulated bars 202. By the same token, a sharp contact plate 212 can be provided in alignment therewith on each of the grounding uprights 204. The distance between the grounding uprights of each tower mounted unit is such so as to allow for a limited relative movement between the towers, while at the same time precluding any excessive misalignment such as would adversely affect the operation of the apparatus. With reference particularly to FIG. 32, if deemed desirable so as to provide for an adjustment of the degree of misalignment which will effect a stopping of the apparatus, adjustable contact or grounding plates 214 can be provided, each mounted on one of the uprights 204 by a threaded bolt 216 rigidly fixed with the plate 214 and adjustably mounted on the corresponding grounding upright 204 or a mounting plate thereon whereby an adjustment of the contact plate 214 can be effected in an obvious manner.

Figure 33:
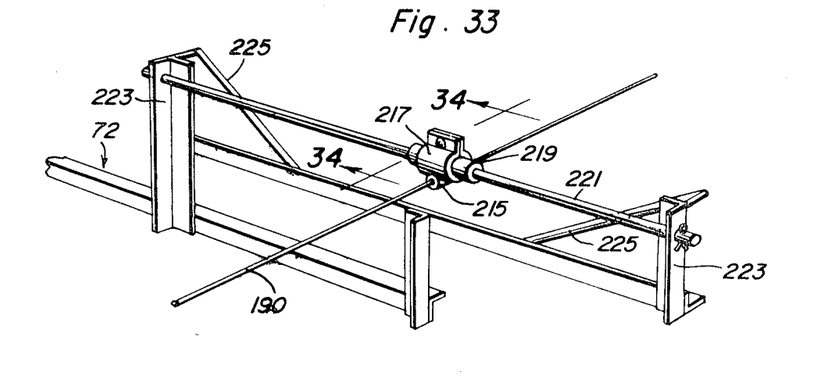
FIG. 33 is a perspective detail of another form of misalignment signalling system.
Figure 34:
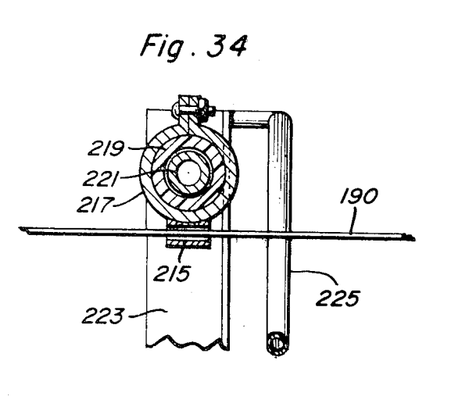
FIG. 34 is a cross-sectional detail taken substantially on a plane passing along line 34—34 in FIG. 33.
Figure 35:
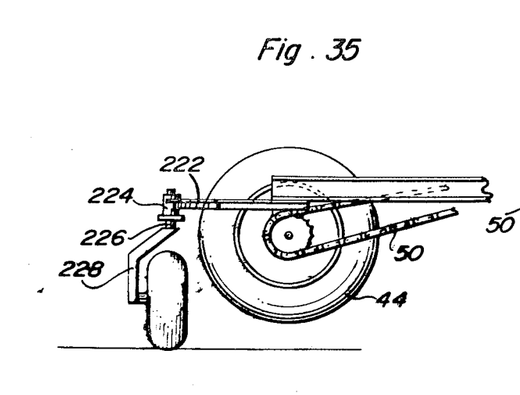
FIG. 35 is a side elevational detail of one end of one of the mobile towers with a transporting wheel mounted thereon for lateral movement of the system.
Figure 36:
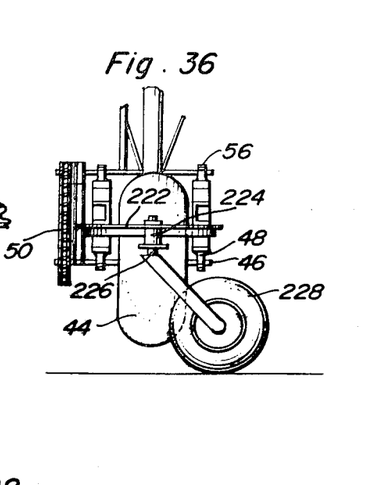
FIG. 36 is a front elevational view of the structure of FIG. 35.

FIGS. 33 and 34 illustrate a variation in the shutoff system wherein the cable 190 is received through a tubular wire guide 215 which is mounted, by an appropriate split clamp 217, on an elongated nonconductive plastic sleeve 219. The plastic sleeve 219 is in turn freely slidable along an elongated metal guide tube 221 which is affixed between a pair of conductive uprights 223 appropriately mounted on the support frame 72. An inclined grounding bar 225 inclines inwardly and downwardly from the upper end of each of the uprights 223 into the path of movement of the wire 190 as the towers tend to misalign. Each of the grounding bars or rods 225 are laterally offset from the uprights 223 and tubular guide 221 so as to insure a contact of the wire 190 therewith upon a relative sliding of the wire mounting clamp 217 and sleeve 219 along the guide 221. As will be appreciated, the plastic insulating sleeve 219 precludes any accidental grounding of the wire 190 until the wire contacts either one or the other of the grounds . bars 225, at which time the pump motor will be shut off as previously described. It will of course be appreciated that the distance between the grounding bars 225 is formed so as to allow for the permissible limited relative movement between the towers, while at the same time avoiding any excessive misalignment.

While not specifically described supra, the actual structure of the individual towers will be readily apparent from the drawings. This structure consists basically of an A-frame with auxiliary struts, the towers being interconnected not only by the water-distributing pipe 88, but also by various cables 218 extending both between the peaks of the towers and between the towers at the level of the platforms 72. Noting FIG. 5, the upper cables will actually engage an equalizing bar pivotally mounted at the peak of each frame and pivotable so as to relieve some of the stress caused by the system moving over rough ground. Noting FIG. 2, appropriate cable guiding crossbars 220 can be mounted directly on the water-distributing pipe 88 between the towers. In addition, auxiliary support for the water-distributing pipe 88 is provided for by the aforementioned suspension cable 172 which extend from the upper ends of the towers to various pipe-engaging clamps such as clamp 170.

Attention is now specifically directed to FIGS. 2, 4, 35 and 36 wherein it will be noted that each end of each tower carriage 38 is provided with an outwardly projecting V or U-shaped member 222. Each of these members 222 in effect encircles the corresponding wheel 44 and mounts, at the apex end of the member 222 outward of the corresponding wheel 44, a vertical bushing 224. This vertical bushing in turn is adapted to receive the shaft 226 of a caster wheel-type unit 228. This mounting of the caster wheel unit 228 will actually require a jacking up of the corresponding end of the tower carriage and tower itself with the caster wheel unit, or rather the pair of caster wheel units to be associated with each tower, maintaining the tower in an elevated position whereby a movement of the entire system lengthwise can be effected, such being necessary when, as an example, moving the apparatus to a new location. Once the new location is reached, the caster wheel units 228 will be removed and the towers lowered into operative engagement with the ground. Incidently, it will be appreciated that the two legs of each of the V or U-shaped members 222 will be welded or bolted to the adjoining end portions of the carriage side beams 40 and actually constitute a rigid extension thereof.

From the foregoing, it will be appreciated that a highly novel irrigation system has been described, this system incorporating self-propelled apparatus utilizing a unique arrangement for powering the individual towers in response to movement of the towers immediately outward thereof. As described previously, the propelling means on each tower consists of a water-powered motor which is directly controlled from the tower immediately outward thereof with the outermost tower running continuously, during the operation of the apparatus, at a predetermined rate so as to set the speed of movement of the entire system. The system also incorporated an automatic cutoff means for the motor or engine energizing the water supplying pump should any excessive misalignment occur. This in turn will immediately shutdown the entire system in that the pressurized water utilized in the water-powered motors associated with the towers is actually drawn from the main water-distributing pipe which is in turn supplied by the pump. The system of the instant invention is equally adaptable for movement clockwise or counterclockwise about the source connected end of the water-distributing pipe through merely the interchange of a pair of cables on each tower and the diverting of the motor driving water flow through the manipulation of a pair of manual valves.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A field irrigation system comprising an elongated water-distributing pipe, means engaging a portion of said pipe with a pressurized water supply for the movement of water under pressure through said pipe, a plurality of laterally aligned mobile towers positioned along and supporting said pipe, a water motor on each tower for effecting a driving of the tower upon an energization of the motor, said towers including a first tower, the motor of which is continuously energized upon the presence of a pressurized water flow within said water-distributing pipe, the water motors on the remaining towers each being operative in response to a movement of an adjacent tower to a predetermined position relative thereto whereby a movement of the first tower, through an energization of the motor thereof, will effect a sequential movement of the remaining towers, movement of each of the remaining towers ceasing upon a movement thereof to a position relative to the adjacent tower less than said relative predetermined position, each tower including ground-engaging wheel means, the water motor on each of said remaining towers including a water wheel drivingly engaged with the associated ground-engaging wheel means, a water line extending from the water-distributing pipe to the water wheel, nozzle means on the water line directed to discharge water therefrom in a wheel driving manner against said water wheel, and a control valve in said water line for selectively opening said line to allow a flow of water therethrough, and means for operating the control valve and hence the water motor in response to movement of the adjacent tower comprising control cable means operatively engaged between the control valve and the adjacent tower for the control of the opening and closing of the control valve in response to a movement of this adjacent tower to a predetermined position.

2. The system of claim 1, wherein the means engaging a portion of said pipe with a pressurized water supply is engaged at a first end of said pipe and defines a pivotal mount for said pipe for a swinging of the pipe in a horizontal circular path thereabout, said first end of the pipe constituting the inner end of the pipe, said first tower supporting the outer end of said pipe and constituting the outermost tower, the remaining towers being aligned inwardly of the outermost tower along the length of said pipe.

3. The system of claim 2 wherein the adjacent tower controlling the movement of each tower is the next outer tower relative thereto along the length of the pipe.

4. The system of claim 3 wherein each water motor includes two nozzle means orientated to discharge against the associated water wheel to the opposite sides of the center of rotation thereof for effecting a selective rotation of the water wheel in opposite directions, and means for selectively controlling the flow of water to one or the other of the two nozzle means whereby a selective driving of the water wheel, and hence the water motor, in opposite direction is possible so as to effect a selective forward or reverse driving of the system.

5. The system of claim 4 including a control bar pivotally mounted between the ends thereof to each of the towers inward of the outermost tower and in alignment with the control valve thereon, a pair of flexible lines engaged with the opposite ends of said pivotally mounted control bar to the opposite sides of the pivotal mounting, and securing means on the outer ends of said flexible lines for a selective engagement of one or the other of said lines with the control valve for the operation thereof in response to a pivoting of the control bar, said cable means comprising a pair of control cables, one engaged with each end of said control bar and extending therefrom, over tower mounted guides, to the adjacent tower, said control cables crossing between the two towers and effecting, through a tensioning of one or the other of the control cables depending upon the direction of movement of the towers, a pivoting of the control bar and an opening of the control valve for an activation of the water motor.

6. The system of claim 5 wherein the pressurized water supply comprises a pump and motor means for said pump, and means for selectively deenergizing the pump motor means upon an excessive misalignment of said towers, said last-mentioned means comprising an elongated cable extending longitudinally along said system and across said towers, means mounting the opposite ends of said cable on the two extreme end towers, and guide means on selected ones of the intermediate towers receiving the cable therethrough and including means selectively cooperating with the cable whereby an engagement therebetween, effected by a misalignment of one or more of the towers, effects an automatic deenergization of the pump motor means which in turn terminates the flow of pressurized water and deenergizes the water motors.

7. The system of claim 6 wherein said misalignment signalling cable is electrically conductive and engaged with an appropriate safety switch on said pump motor means, said tower mounted guide means including an insulated section therein receiving the cable upon a proper alignment of the system, the means selectively engaged by the cable upon a misalignment of the towers being in the nature of an electrically conductive ground.

8. The system of claim 7, wherein each tower includes selectively mountable caster wheels depending below the ground-engaging wheel means and orientable at right angles thereto whereby a lateral traveling of the towers along the lengthwise direction of the system can be effected.

9. The system of claim 8 wherein said water-distributing pipe is sectional in nature with the sections thereof interlocked by flexible coupling means, and means mounting said pipe on each tower for limited movement relative thereto.

10. The system of claim 1 wherein each water motor includes two nozzle means orientated to discharge against the associated water wheel to the opposite sides of the center of rotation thereof for effecting a selective rotation of the water wheel in opposite directions, and means for selectively controlling the flow of water to one or the other of the two nozzle means whereby a selective driving of the water wheel, and hence the water motor, in opposite directions is possible so as to effect a selective forward or reverse driving of the system.

11. The system of claim 3 including a control bar pivotally mounted intermediate the ends thereof to each of the towers inward of the outermost tower and in alignment with the control valve thereon, a pair of flexible lines engaged with the opposite ends of said pivotally mounted control bar to the opposite sides of the pivotal mounting, and securing means on the outer ends of said flexible lines for a selective engagement of one or the other of said lines with the control valve for the operation thereof in response to a pivoting of the control bar, said cable means comprising a pair of control cables, one engaged with each end of said control bar and extending therefrom, over tower mounted guides, to the adjacent tower, said control cables crossing between the two towers and effecting, through a tensioning of one or the other of the control cables depending upon the direction of movement of the towers, a pivoting of the control bar and an opening of the control valve for an activation of the water motor.

12. A field irrigation system comprising an elongated water-distributing pipe, means engaging a portion of said pipe with a pressurized water supply for the movement of water under pressure through said pipe, a plurality of laterally aligned mobile towers positioned along and supporting said pipe, a water motor on each tower for effecting a driving of the tower upon an energization of the motor, said towers including a first tower, the motor of which is continuously energized upon the presence or a pressurized water flow within said water-distributing pipe, the water motors on the remaining towers each being operative in response to a movement of an adjacent tower to a predetermined position relative thereto whereby a movement of the first tower, through an energization of the motor thereof, will effect a sequential movement of the remaining towers, movement of each of the remaining towers ceasing upon a movement thereof to a position relative to the adjacent tower less than said relative predetermined position, the means engaging a portion of said pipe with a pressurized water supply being engaged at a first end of said pipe and defining a pivotal mount for said pipe for a swinging of the pipe in a horizontal circular path thereabout, said first end of the pipe constituting the inner end of the pipe, said first tower supporting the outer end of said pipe and constituting the outermost tower, the remaining towers being aligned inwardly of the outermost tower along the length of said pipe, the pressurized water supply comprising a pump and motor means for said pump, and means for selectively deenergizing the pump motor means upon an excessive misalignment of said towers, said last-mentioned means comprising an elongated cable extending longitudinally along said system and across said towers, means mounting the opposite ends of aid cable on the two extreme end towers, and guide means on selected ones of the intermediate towers receiving the cable therethrough and including means selectively cooperating with the cable whereby an engagement therebetween, effected by a misalignment of one or more of the towers, effects an automatic deenergization of the pump motor means which in turn terminates the flow of pressurized water and deenergizes the water motors, said misalignment signalling cable being electrically conductive and engaged with an appropriate safety switch on said pump motor means, said tower mounted guide means including an insulated section therein receiving the cable upon a proper alignment of the system, the means selectively engaged by the cable upon a misalignment of the towers being in the nature of an electrically conductive ground.

13. A field irrigation system comprising an elongated water-distributing pipe, means engaging a portion of said pipe with a pressurized water supply for the movement of water under pressure through said pipe, a plurality of laterally aligned mobile towers positioned along and supporting said pipe, a water motor on each tower for effecting a driving of the tower upon an energization of the motor, said towers including a first tower, the motor of which is continuously energized upon the presence of a pressurized water flow within said water-distributing pipe, the water motors on the remaining towers each being operative in response to a movement of an adjacent tower to a predetermined position relative thereto whereby a movement of the first tower, through an energization of the motor thereof, will effect a sequential movement of the remaining towers, movement of each of the remaining towers ceasing upon a movement thereof to a position relative to the adjacent tower less than said relative predetermined position, and speed control means on said first tower, said speed control means operatively engaging the water motor associated with said first tower for a selective partial deenergization thereof in response to an increase in the speed of the first tower beyond a predetermined point.

14. The system of claim 13 wherein each tower includes ground-engaging wheel means, the water motor on each of said towers including a water wheel drivingly engaged with the associated ground-engaging wheel means through a chain-type drive, a water line extending from the water-distributing pipe to the water wheel, nozzle means on the water line directed to discharge water therefrom in a wheel driving manner against the associated water wheel, said speed control means on said first tower including a control valve in said water line, and means for selectively partially closing said control valve comprising a cable hookup between said control valve and said chain-type drive for a selective operation of the valve in response to a selective slackening and tensioning of selected portions of said chain-type drive resulting from a variation in the speed of the ground-engaging wheel means relative to that directly attributable to the driving force of the water wheel.

15. The system of claim 3 including a control bar pivotally mounted intermediate the ends thereof to each of the towers inward of the outermost tower and in alignment with the control valve thereon, a flexible line engaged with a first end of said pivotally mounted control bar and extending therefrom into engagement with the control valve for operation thereof in response to a pivoting of the control bar, said cable means comprising a control cable engaged with the second end of the control bar and extending therefrom, over tower mounted guides, to the adjacent tower, said control cable effecting, through a selective tensioning thereof, a pivoting of the control bar and an opening of the control valve for an activation of the water motor.

16. The system of claim 1, wherein said water-distributing pipe is sectional in nature with the sections thereof interlocked by couplings, one such coupling comprising a generally circular member having adjacent opposite ends, the opposite ends thereof incorporating mounting flanges for the selective reception of bolts therethrough for a locking of the member about adjacent ends of a pair of pipe sections, a pair of split collars, one encircling each pipe section to each of the opposite sides of the coupling member, an elongated tie bar having opposed ends engaged with the two collars and overlying the coupling member, said tie bar including means for anchoring one end of a support cable utilized in conjunction with an adjacent tower.

17. A field irrigation system comprising a horizontally extending elongated water-distributing pipe, means pivotally mounting one end of said pipe in communication with a source of pressurized water, said pipe, outwardly from said one end, being supported by a plurality of self-propelled support towers, powered pump means associated with the source of pressurized water for the pressurized supply of water to the water-distributing pipe, misalignment signalling means engaged with said towers and powered pump means for the automatic deenergization of the pump means upon a misalignment of the towers, said misalignment signalling means including an electrically conductive cable extending from the powered pump means transversely across the towers along the length of the water-distributing pipe, positioning means on selected ones of said towers receiving said cable, said positioning means including insulating means supporting the cable, and a cable grounding area into which said cable moves upon a misalignment of said towers, the movement of the cable into one or more of the grounding areas effecting the deenergization of the powered pump means, and a halting of pressurized flow of water.

18. The system of claim 17 wherein said positioning means includes a tubular wire guide receiving said cable therethrough, an elongated metal guide tube positioned transversely across said cable, said tubular wire guide being mounted on said guide tube for transverse sliding therealong, said insulating means including an elongated nonconductive plastic sleeve within said wire guide and between said wire guide and said guide tube, said cable grounding area constituting a grounding bar located toward each end of the guide tube within the path of transverse movement of the cable.

19. A field irrigation system including a series of pipe supporting self-propelled towers, each tower including a wheeled carriage, a structural frame projecting upwardly from said carriage, a water motor mounted on said frame in elevated position above the carriage, said water motor including a vertically orientated water wheel having a plurality of outwardly projecting arms peripherally thereabout, each arm mounting a pair of oppositely directed cups, said water wheel being centrally mounted for rotation, nozzle means orientated above and below the center of rotation of the water wheel and in alignment with the cups, water supply means communicating with each nozzle means, and means for directing water to selected ones of the nozzle means, ground engaging wheel means on said carriage, and a power transmitting train extending between the water wheel and the wheel means for effecting a driving of the wheel means in response to a rotation of the water wheel resulting from a discharge of water thereagainst from selected ones of the nozzle means, the oppositely directed cups in conjunction with selected ones of the nozzle means enabling a selective driving of the tower in opposite directions.

20. The system of claim 19 wherein the selected ones of said nozzle means discharge water simultaneously in opposite directions for effecting, in addition to a driving of the wheel means, a substantially even distribution of the discharging water over a predetermined area.

21. The system of claim 20 wherein the selected ones of the nozzle means includes, in each instance, a pair of oppositely directed nozzles, one located above the center of rotation of the water wheel and one located below the center of rotation of the water wheel, said nozzle discharging in generally opposed directions.

22. A field irrigation system including a series of pipe supporting self-propelled towers, each tower including a wheeled carriage, a structural frame projecting upwardly from said carriage, a water motor mounted on said frame in elevated position above the carriage, said water motor including a water wheel mounting pairs of oppositely directed cups at peripherally spaced points thereabout, said water wheel being centrally mounted for rotation, nozzle means oriented to the opposite sides of the center of rotation of the water wheel and in alignment with the cups, water supply means communicating with each nozzle means, and means for directing water to selected ones of the nozzle means, ground engaging wheel means on said carriage, and a power transmitting train extending between the water wheel and the wheel means for effecting a driving of the wheel means in response to a rotation of the water wheel resulting from a discharge of water thereagainst from selected ones of the nozzle means, the oppositely directed cups in conjunction with selected ones of the nozzle means enabling a selective driving of the tower in opposite directions.

23. A field irrigation system comprising a horizontally extending elongated water-distributing pipe, said pipe being supported by a plurality of self-propelled support towers, a source of pressurized water communicated with said pipe, powered pump means associated with the source of pressurized water for the pressurized supply of water to the water-distributing pipe, misalignment signalling means engaged with said towers and powered pump means for the automatic deenergization of the pump means upon a misalignment of the towers, said misalignment signalling means including an electrically conductive cable extending from the powered pump means transversely across the towers along the length of the water-distributing pipe, positioning means on selected ones of said towers receiving said cable, said positioning means including insulating means supporting the cable, and a cable grounding area into which said cable moves upon a misalignment of said towers, the movement of the cable into one or more of the grounding areas effecting the deenergization of the powered pump means, and a halting of the pressurized flow of water.

* * * * *